United States Patent
Sugiyama et al.

(10) Patent No.: US 9,837,834 B2
(45) Date of Patent: Dec. 5, 2017

(54) BATTERY APPARATUS

(71) Applicant: PANASONIC INTELLECTUAL PROPERTY MANAGEMENT CO., LTD., Osaka (JP)

(72) Inventors: Shigeyuki Sugiyama, Kanagawa (JP); Mamoru Aoki, Kanagawa (JP); Manabu Nakakita, Kanagawa (JP); Kazushige Kakutani, Kanagawa (JP); Takuma Iida, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 190 days.

(21) Appl. No.: 14/779,661

(22) PCT Filed: Mar. 20, 2014

(86) PCT No.: PCT/JP2014/001649
§ 371 (c)(1),
(2) Date: Sep. 24, 2015

(87) PCT Pub. No.: WO2014/162686
PCT Pub. Date: Oct. 9, 2014

(65) Prior Publication Data
US 2016/0049814 A1   Feb. 18, 2016

(30) Foreign Application Priority Data
Apr. 3, 2013  (JP) .................. 2013-077888

(51) Int. Cl.
*H01M 10/46* (2006.01)
*H02J 7/00* (2006.01)
(52) U.S. Cl.
CPC .......... *H02J 7/0021* (2013.01); *H02J 7/0063* (2013.01); *H02J 2007/0067* (2013.01)

(58) Field of Classification Search
CPC ...... H02J 7/1423; H02J 7/0013; H02J 7/0026; H02J 7/0021
(Continued)

(56) References Cited

U.S. PATENT DOCUMENTS

2004/0145186 A1*  7/2004  Inokuchi ............... B60L 11/123
                                                   290/40 C
2013/0063091 A1   3/2013  Nishi et al.
2014/0184159 A1   7/2014  Kachi

FOREIGN PATENT DOCUMENTS

CN    202423480 U   9/2012
JP    10-155246 A   6/1998
(Continued)

OTHER PUBLICATIONS

European Search Report for Application No. EP 14 77 9058 dated Mar. 10, 2016.
(Continued)

*Primary Examiner* — Edward Tso
(74) *Attorney, Agent, or Firm* — Pearne & Gordon LLP

(57) ABSTRACT

The battery system is a combined system of a first battery and a second battery. The discharging curve (discharging characteristic) (311) of the first battery has a stable region (B1). The discharging curve (discharging characteristic) (321) of the second battery has a stable region (B2) in the range of voltage lower than the voltage in the stable region (B1) of the first battery and also has an unstable region (A2) in the range of voltage overlapping the voltage in the stable region (B1) of the first battery. The first battery and the second battery are connected in parallel so that, in a discharging process, the discharging state of the entire battery shifts from the stable region (B1) of the first battery to the stable region (B2) of the second battery.

13 Claims, 9 Drawing Sheets

(58) Field of Classification Search
USPC .... 320/107, 112, 132, 149, 116; 429/90, 99; 324/433, 434
See application file for complete search history.

(56) References Cited

FOREIGN PATENT DOCUMENTS

| | | |
|---|---|---|
| JP | 2001-286004 A | 10/2001 |
| JP | 2003-174734 A | 6/2003 |
| JP | 2004-025979 A | 1/2004 |
| JP | 2004-111242 A | 4/2004 |
| JP | 2011-230618 A | 11/2011 |
| WO | 2013/054795 A1 | 4/2013 |

OTHER PUBLICATIONS

International Search Report for Application No. PCT/JP2014/001649 dated May 27, 2014.
English translation of Search Report issued in Chinese Patent Application No. 201480018722.8 dated Jun. 18, 2017.

\* cited by examiner

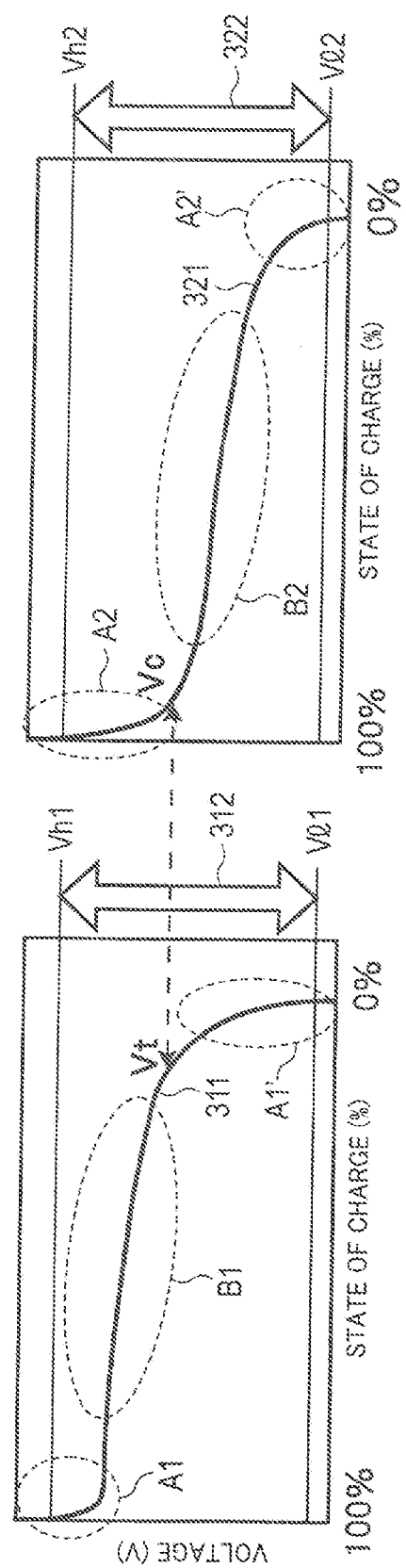

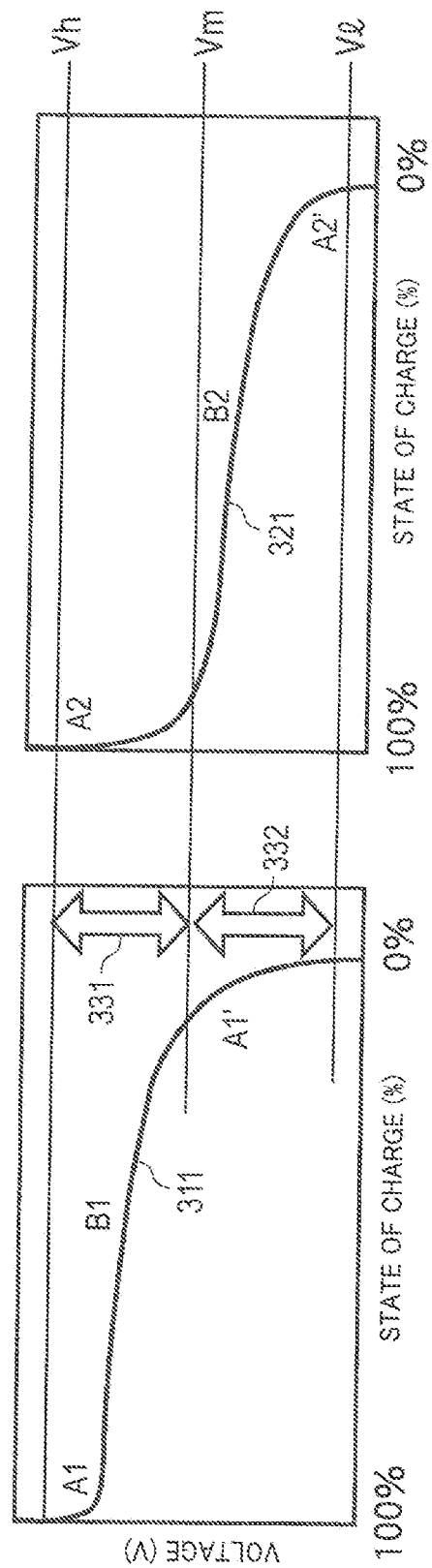

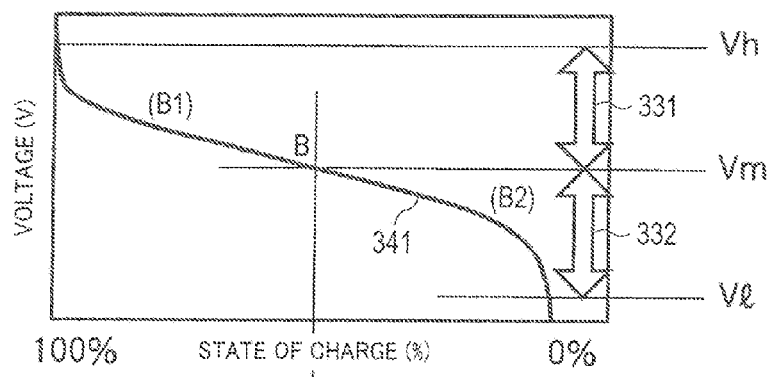
FIG. 5A
FIG. 5B
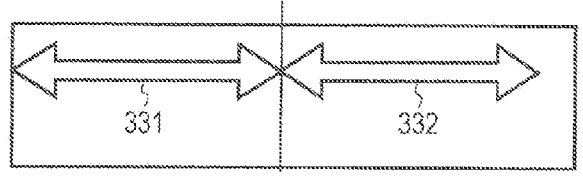
FIG. 5C  IN THE MORNING
FIG. 5D  LUNCH BREAK
FIG. 5E  AFTERNOON
FIG. 5F  EVENING

|  | FIRST BATTERY | SECOND BATTERY |
|---|---|---|
| 351 VERTICAL RANGE OF VOLTAGE UNSTABLE PORTION A | NARROW | WIDE |
| 352 VOLTAGE IN VOLTAGE STABLE PORTION B | HIGH | LOW |
| 353 VERTICAL RANGE OF VOLTAGE UNSTABLE PORTION A' | WIDE | NARROW |
| 354 CHARGED-STATE RETENTION CHARACTERISTIC IN NOMINAL VOLTAGE RANGE | POOR | GOOD |
| 355 DISCHARGED-STATE RETENTION CHARACTERISTIC IN NOMINAL VOLTAGE RANGE | GOOD | POOR |
| 356 EXPECTED SPECIFIC BATTERY TYPE | LITHIUM-ION BATTERY (PARTICULARLY, TERNARY-BASED, Ni-BASED, Fe-BASED) | LEAD-ACID BATTERY (PARTICULARLY, OPEN-TYPE) |

| | FIRST BATTERY (100) | SECOND BATTERY (200) |
|---|---|---|
| BATTERY TYPE | Li-ion BATTERY (3.2V) LiFePO4 | OPEN-TYPE LEAD-ACID BATTERY (2V) |
| NOMINAL | 57.6V (18 SERIES) 150Ah | 48V (24 SERIES) 250Ah |
| UPPER LIMIT VOLTAGE | 64V (3.55V/cell) | 64V (2.67V/cell) |
| LOWER LIMIT VOLTAGE | 40V (2.22V/cell) | 40V (1.67V/cell) |
| REMARKS | PROTECTION CIRCUIT: YES | |

FIG. 9

| | FIRST BATTERY (100) | SECOND BATTERY (200) |
|---|---|---|
| BATTERY TYPE | Li-ion BATTERY (3.6V) LiNiO2 | OPEN-TYPE LEAD-ACID BATTERY (2V) |
| NOMINAL | 57.6V (16 SERIES) 150Ah | 48V (24 SERIES) 250Ah |
| UPPER LIMIT VOLTAGE | 64V (4.0V/cell) | 64V (2.67V/cell) |
| LOWER LIMIT VOLTAGE | 40V (2.5V/cell) | 40V (1.67V/cell) |
| REMARKS | PROTECTION CIRCUIT: YES | |

|  | FIRST BATTERY (100) | SECOND BATTERY (200) |
|---|---|---|
| BATTERY TYPE | Li-ion BATTERY (2.4V) LTO | OPEN-TYPE LEAD-ACID BATTERY (2V) |
| NOMINAL | 57.6V (24 SERIES) 150Ah | 48V (24 SERIES) 250Ah |
| UPPER LIMIT VOLTAGE | 64V (2.67V/cell) | 64V (2.67V/cell) |
| LOWER LIMIT VOLTAGE | 40V (1.67V/cell) | 40V (1.67V/cell) |
| REMARKS | PROTECTION CIRCUIT: YES |  |

FIG. 10

BATTERY APPARATUS

TECHNICAL FIELD

The present invention relates to a battery system to be applied to an electric vehicle, for example.

BACKGROUND ART

Heretofore, lead-acid batteries, which are relatively low-priced and well-proven in use, have been widely used as power supplies for electric automobiles, for example. Meanwhile, lithium-ion batteries, which are high-voltage-available and include high-energy density, have also been used as the power supplies in recent years.

However, the charge receiving performance of lead-acid batteries is low, so that it is difficult to efficiently store regenerative energy which is available during braking of vehicles such as electric automobiles (hereinafter, simply referred to as "vehicle" or "vehicles"). Meanwhile, lithium-ion batteries involve high manufacturing costs, and it is difficult to increase the capacity of lithium-ion batteries. For this reason, sufficiently ensuring the power required to start the engine of a vehicle, using lithium-ion batteries is difficult.

In this respect, Patent Literature (hereinafter, referred to as "PTL") 1 and PTL 2, for example, disclose a technique that connects in parallel a lithium-ion battery having a low internal resistance and a lead-acid battery having a large capacity. According to the technique, a battery system having a high charge receiving performance and a large capacity can be obtained, inexpensively.

CITATION LIST

Patent Literature

PTL 1
Japanese Patent Application Laid-Open No. 2003-174734
PTL 2
Japanese Patent Application Laid-Open No. 2004-25979

SUMMARY OF INVENTION

Technical Problem

With the related art mentioned above, it is difficult to keep the performance of the entire battery composed of a plurality of secondary batteries as a secondary battery, including the charge receiving performance and capacity (hereinafter, referred to as "performance" for simplicity). This is because secondary batteries such as lead-acid batteries and lithium-ion batteries may degrade in performance normally according to use conditions including degradation due to over-charging and over-discharging or the like or differences in capacity recovery performance depending on the stored states of batteries, for example. In addition, such degradation in performance of individual secondary batteries leads to degradation in performance of the entire battery.

An object of the present invention is thus to provide a battery system that is capable of being increased in capacity inexpensively and that has a high charge receiving performance, while being hard to degrade in performance.

Solution to Problem

A battery system according to this disclosure is a battery system including a combination of first and second batteries, in which the first battery has a discharge characteristic that includes a stable region where a voltage change rate with respect to a discharged capacity is small, the second battery has a discharge characteristic that includes: a stable region where a voltage change rate with respect to a discharged capacity is small in a voltage range lower than a voltage of the stable region of the first battery; and an unstable region where a voltage change rate with respect to a discharged capacity is large in a voltage range that overlaps a voltage in the stable region of the first battery, and the first battery and the second battery are connected to each other in parallel so that a state of discharge of an entire battery including the first battery and the second battery transitions from the stable region of the first battery to the stable region of the second battery in a discharge process of the entire battery.

Advantageous Effects of Invention

According to the present invention, a battery system can be obtained which is capable of being increased in capacity inexpensively and which has a high charge receiving performance, while being hard to degrade in performance.

BRIEF DESCRIPTION OF DRAWINGS

FIGS. 3A and 3B are diagrams provided for illustrating an example of a relationship between discharge characteristics of first and second batteries in the present invention;

FIGS. 4A and 4B are each a diagram illustrating an example of a relationship between a voltage and a state of discharge of a battery in the battery system according to the present invention;

FIGS. 5A to 5F are diagrams provided for illustrating an example of a relationship between a discharge characteristic and a charge and discharge pattern of the battery system according to the present invention;

FIG. 6 is a diagram illustrating exemplary conditions for a combination of the first and the second batteries in the battery system according to the present invention;

FIG. 8 is a diagram illustrating a first specific example of the first and the second batteries in the embodiment;

FIG. 9 is a diagram illustrating a second specific example of the first and the second batteries in the embodiment;

FIG. 10 is a diagram illustrating a third specific example of the first and the second batteries in the embodiment;

DESCRIPTION OF EMBODIMENT

Hereinafter, a description will be given of an embodiment of the present invention with reference to the accompanying drawings.

First, an overview of the present invention will be described.

Figure 1:
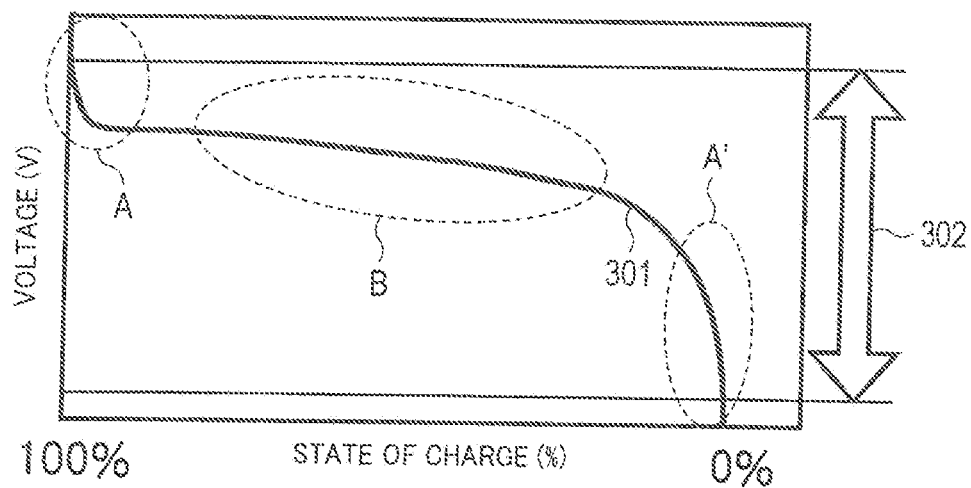
FIG. 1 is a diagram illustrating an example of a discharge characteristic of a general battery.

FIG. 1 is a diagram illustrating an example of a discharge characteristic of a general secondary battery (hereinafter, referred to as "battery"). In FIG. 1, the horizontal axis represents the state of charge (SOC) [%] within a range from 100% to 0%, and the vertical axis represents the voltage [V]. In addition, the terms "initial phase" and "terminal phase," and "start phase" and "end phase" are used in the following description with the direction in which discharge proceeds, as the basis.

As illustrated in FIG. 1, in discharge curve 301, which is a discharge curve of a general battery, when discharge continues, the state of charge decreases (i.e., the remaining charge capacity decreases), and the voltage decreases with the decrease in the state of charge. The discharge initial and terminal phase portions of discharge curve 301 each include an unstable region (denoted by symbol "A" or "A'"). The middle portion of discharge curve 301 includes a stable region (denoted by symbol "B").

Unstable regions A and A' are each a region where the voltage changes significantly with a little change in the state of charge, i.e., a region where the change rate of voltage with respect to the discharged capacity is large. Stated differently, the unstable regions are a region where discharged curve 301 changes steeply.

More specifically, unstable region A is a region where the voltage decreases significantly with a little decrease in the state of charge during the initial phase of discharge starting from a fully-charged state. Moreover, unstable region A' is a region where the voltage decreases significantly with a little decrease in the state of charge during the terminal phase of discharge toward a state of complete discharge.

Stable region B is a region where the change rate for a voltage change is small even when the state of charge changes, i.e., a region where a voltage change rate with respect to a discharged capacity is small. Stated differently, stable region B is a region where discharge curve 301 changes, moderately.

As described above, discharge curve 301 of the battery is a curve that extends from unstable region A to the start phase of stable region B and extends to unstable region A' from the terminal phase of stable region B.

The voltage range used in an actual device may be a broader than nominal voltage range 302 of the battery. Accordingly, in actual use, there may be overcharging in which charging is performed until a voltage higher than nominal voltage range 302, or over-discharging in which discharge is performed until a voltage lower than nominal voltage range 302.

Overcharging easily occurs in unstable region A, and over-discharging easily occurs in unstable region A'. Meanwhile, overcharging and over-discharging accelerate degradation of a battery. For this reason, it is favorable that batteries are used in a discharge state that avoids unstable regions A and A' as much as possible.

In this respect, the battery system according to the present invention, for example, combines a first battery and a second battery that has stable region B in a voltage range lower than a voltage in stable region B of the first battery and that has unstable region A in a voltage range that overlaps a voltage in stable region B of the first battery.

The battery system according to the present invention connects the first and the second batteries in parallel with each other, for example, in such a way that the state of discharge of the entire battery composed of the first and the second batteries moves from the stable region of the first battery to the stable region of the second battery during the discharge of the entire battery.

The battery system of this kind can cover at least a part of unstable region A in the initial phase of discharge of the second battery with stable region B of the first battery, thereby making it possible to prevent degradation due to overcharging of the secondary battery.

In addition, in the battery system according to the present invention, for example, the first battery includes unstable region A' in a voltage range that overlaps a voltage of stable region B of the second battery.

The battery system of this kind can cover at least a part of unstable region A' on the last phase side of the first battery with stable region B of the second battery, thereby making it possible to prevent degradation due to over-discharging of the first battery.

More specifically, the battery system according to the present invention can optimize the use conditions of each battery so as to make the entire battery hard to degrade in performance.

Hereinafter, a more detailed description will be given of reasons for optimizing the use conditions of each battery in the battery system according to the present invention.

Figure 2:
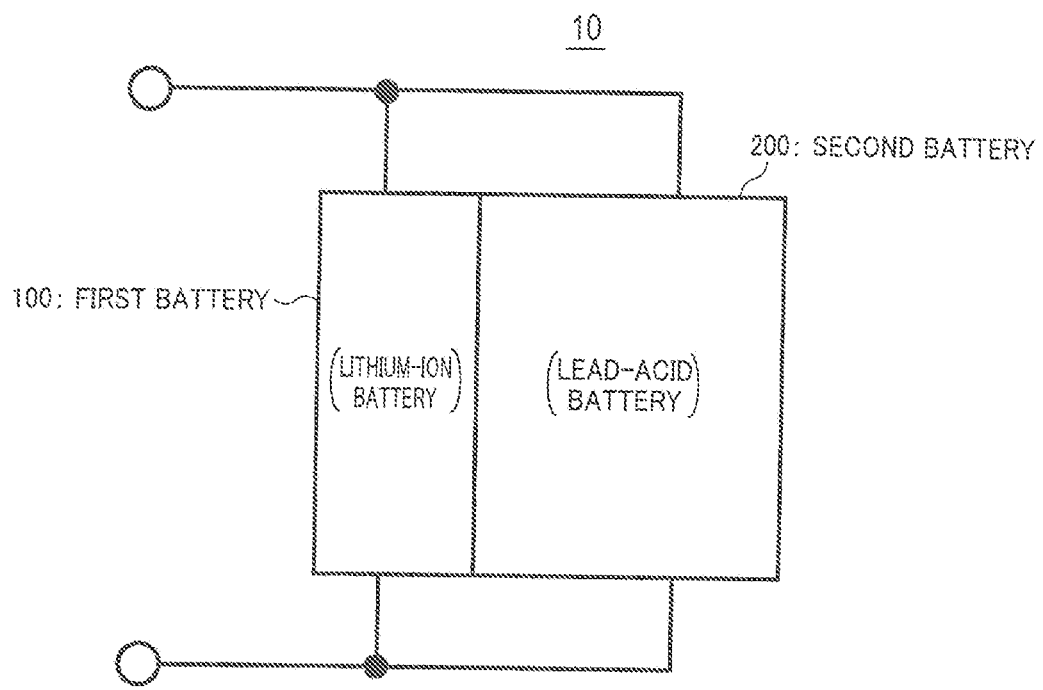
FIG. 2 is a diagram illustrating an example of a schematic configuration of a battery system according to the present invention.

FIG. 2 is a diagram illustrating an example of a schematic configuration of the battery system according to the present invention.

In FIG. 2, battery system 10 is formed by combination of first battery 100 and second battery 200. First battery 100 and second battery 200 are connected electrically in parallel with each other. More specifically, the positive electrode terminal of first battery 100 and the positive electrode terminal of second battery 200 are connected to each other while the negative electrode terminal of first battery 100 and the negative electrode terminal of second battery 200 are connected to each other.

Hereinafter, an assumption is made that first battery 100 is a lithium-ion battery, and second battery 200 is a lead-acid battery.

Lithium-ion batteries are a type of non-aqueous secondary battery and are secondary batteries in which lithium-ions in an electrolyte allow electricity to flow. In a typical cell configuration, lithium-containing metal oxide such as lithium cobalt oxide is used for the positive electrode and a carbon material is used for the negative electrode while an organic electrolytic solution is used for an electrolytic solution. Moreover, a wound type electrode unit in which the positive and negative electrodes are wound with a separator interposed therebetween is housed in a cylindrical battery can while being immersed in a non-aqueous electrolytic solution.

The characteristics of lithium-ion batteries include a high-voltage providing capability, its highly-efficient energy charging and discharging, and a quick charging and discharging capability. Meanwhile, the characteristics of lithium-ion batteries include being susceptible to overcharging and over-discharging, and drastic degradation when stored in a fully-charged state. Moreover, the characteristics of lithium-ion batteries include a better capacity recovery performance when stored in a charged state than when stored in a discharged state. The term "capacity recovery performance" used herein refers to the characteristic of a battery as to what level the battery is capable of recovering the capacity of battery as compared with the initial capacity, when charging and discharging are performed after the battery is stored.

Lead-acid batteries are aqueous system secondary batteries, and lead dioxide is used for the positive electrode and spongiform lead is used for the negative electrode while dilute sulfuric acid is used as the electrolytic solution. Each cell chamber houses therein a group of electrodes including a plurality of positive electrode plates and a plurality of negative electrode plates stacked with a glass fiber separator interposed therebetween.

Lead-acid batteries are relatively inexpensive, so that they are well proven-in use as large capacity batteries. Meanwhile, lead-acid batteries include a characteristic that overdischarging accelerates degradation. Moreover, lead-acid batteries include a characteristic that the batteries have a better capacity recovery performance when stored in a charged state than when stored in a discharged state.

FIGS. 3A and 3B are diagrams provided for illustrating an example of the relationship between the discharge characteristics of first and second batteries 100 and 200. FIG. 3A indicates the discharge characteristic of first battery 100, and FIG. 3B indicates the discharge characteristic of second battery 200. FIGS. 3A and 3B each correspond to FIG. 1. Furthermore, FIGS. 3A and 3B each include a vertical axis placed so as to correspond to FIG. 1.

Discharge curve 311 of first battery 100 has an unstable region in a discharge start portion and an unstable region in a discharge end portion (denoted by symbols "A1" and "A1'," respectively) as in the case of discharge curve 301 of a general battery illustrated in FIG. 1. Discharge curve 311 of first battery 100 has a stable region (denoted by symbol "B1") in a middle portion (i.e., portion between unstable regions A1 and A1') as in the case of discharge curve 301 of a general battery illustrated in FIG. 1.

Likewise, discharge curve 321 of second battery 200 has an unstable region in a discharge start portion and an unstable region in a discharge end portion (denoted by symbols "A2" and "A2'," respectively), and a stable region (denoted by symbol "B2").

However, discharge curve 311 of first battery 100 and discharge curve 321 of second battery 200 are different.

More specifically, the details will be given below.

(1) The voltage in stable region B1 of first battery 100 is higher than the voltage in stable region B2 of second battery 200. Stated differently, the voltage in stable region B2 of second battery 200 is lower than the voltage in stable region B1 of first battery 100. Accordingly, there is a difference in voltage between stable regions B1 and B2.

(2) The vertical range of the voltage in unstable region A1 of first battery 100 is narrow, while the vertical range of the voltage in unstable region A2 of second battery 200 is wide. In other words, the voltage drops significantly with a slight change in the state of charge in unstable region A2 of second battery 200.

(3) The vertical range of the voltage in unstable region A1' of first battery 100 is wide, while the vertical range of the voltage in unstable region A2' of second battery 200 is narrow. In other words, the voltage drops steeply with a slight change in the state of charge in unstable region A1' of first battery 100.

Moreover, first and second batteries 100 and 200 are configured so that voltage Vt in the end portion of stable region B1 of first battery 100 and voltage Vc in the start portion of the stable region of second battery 200 substantially match with each other in the discharge characteristics of first and second batteries 100 and 200. In other words, the minimum value of the voltage in stable region B1 of first battery 100 and the maximum value of the voltage in stable region B2 substantially match with each other.

It is possible to substantially match voltages Vt and Vc with each other as described above by adjusting the number of series-connected cells of first battery 100 and second battery 200. In other words, at least one of first and second batteries 100 and 200 is composed of a plurality of battery cells connected in series.

Hereinafter, for convenience of description, it is assumed that voltage Vt in the end portion of stable region B1 of first battery 100 and voltage Vc in the start portion of the stable region of second battery 200 match with each other as voltage value Vm.

In addition, it is assumed that nominal voltage ranges 312 and 322 of first and second batteries 100 and 200 substantially match with each other. In other words, upper limit voltage Vh1 and lower limit voltage Vl1 of first battery 100 substantially match with upper limit voltage Vh2 and lower limit voltage Vl2 of second battery 100, respectively.

Hereinafter, for convenience of description, it is assumed that upper limit voltage Vh1 of first battery 100 and upper limit voltage Vh2 of second battery 200 match with each other as upper limit voltage Vh of battery system 10. In addition, it is assumed that lower limit voltage Vl1 of first battery 100 and lower limit voltage Vl2 of second battery 200 match with each other as lower limit voltage Vl of battery system 10.

FIGS. 4A and 4B are diagrams each illustrating an example of the relationship between the voltage and the state of discharge of the corresponding battery when discharge is performed in battery system 10. Hereinafter, a description will be given with time when discharge continues from a fully-charged state.

As illustrated in FIG. 4A, first battery 100 mainly discharges in region (voltage Vh to Vm) 331 from the start of discharge to voltage Vt in the end portion of stable region B1 of first battery 100. In other words, second battery 200 barely discharges in region 331. This behavior is based on the relationship between the discharge characteristics of first and second batteries 100 and 200, i.e., the voltage in stable region B2 of second battery 200 is lower than the voltage in stable region B1 of first battery 100.

Meanwhile, in region 331 of voltages Vh to Vm, the voltage of second battery 200 follows a change in the voltage of first battery 100 and changes, accordingly. This behavior is based on the configuration in which first and second batteries 100 and 200 are connected in parallel with each other and the voltages of the batteries thus become equal to each other.

Subsequently, second battery 200 mainly discharges in region 332 (voltage Vm to Vl), which is a range from the time when the voltage of battery system 10 reaches voltage Vm in the end portion of stable region B1 of first battery 100 to the end of discharge. More specifically, the state of discharge of battery system 10 transitions from stable region B1 of first battery 100 to stable region B2 of second battery 200, and finally transitions to unstable region A2' of second battery 200. This behavior is based on the configuration in which voltage Vt in the end portion of stable region B1 and voltage Vc in the start region of stable region B2 substantially match with each other as described above.

At least the voltage range of unstable region A2 of second battery 200 partially overlaps a part of the voltage range of unstable region B1 of first battery 100. Accordingly, even when quick-charging is performed, the state of discharge of second battery 200 changes in accordance with a change in the voltage in stable region B1 of first battery 100. For this reason, a moderate change occurs in unstable region A2, which thus reduces chances for overcharging of second battery 200.

In addition, at least the voltage range of unstable region A1' of first battery 100 partially overlaps a part of the voltage range of unstable region B2 of second battery 200. Accordingly, even when discharging is performed, the state of discharge of first battery 100 changes in accordance with a change in the voltage of stable region B2 of second battery 200. For this reason, a moderate change occurs in unstable region A1', which thus makes it easy to avoid over-discharging and thus reduces chances for over-discharging of first battery 100.

Note that, typically, batteries are charged before they are completely discharged. Accordingly, it is preferred that the capacity recovery performance of first battery 100 be high when stored in a discharged state, while the capacity recovery performance of second battery 200 be high when stored in a charged state.

For the point mentioned above, a description will be given with a specific example of a charge and discharge pattern.

FIGS. 5A through 5F are diagrams provided for illustrating an example of the relationship between the discharge characteristic of battery system 10 and a charge and discharge pattern. FIG. 5A indicates the discharge characteristic of battery system 10 (system in which first and second batteries 100 and 200 are connected to each other in parallel). More specifically, FIG. 5A indicates a discharge characteristic in which the discharge characteristics of first and second batteries 100 and 200 illustrated in FIGS. 3A and 3B are combined. FIG. 5B illustrates a region in which first battery 100 mainly discharges and a region in which second battery 200 mainly discharges in a charged state. FIGS. 5C to 5F indicate an example of one-day charge and discharge pattern when battery system 10 is used as a power supply for driving an electric automobile. Note that, hereinafter, charging using regenerative energy from the motor of the electric automobile is ignored for convenience of description, but chances for overcharging of second battery are reduced because of the stable region of first battery 100 in the same manner as described above even when a large current flows suddenly.

Note that, FIG. 5A corresponds to FIGS. 2 to 4B. In addition, FIGS. 5A to 5F are placed so as to correspond to the horizontal axis. Moreover, in FIGS. 5C to 5F, the right-pointing arrow indicates discharging and the left-pointing arrow indicates charging. Furthermore, the length of each arrow corresponds to the size of the capacity of charging and discharging.

As illustrated in FIG. 5A, discharge curve 341 of battery system 10 has a shape formed by combining discharge curve 311 of first battery 100 and discharge curve 321 of secondary battery 200 as illustrated in FIGS. 3A and 3B. More specifically, in discharge curve 341 of battery system 10, stable region B1 of first battery 100 is connected to stable region B2 of second battery 200 in such a way that stable region B2 of second battery 200 extends from stable region B1 of first battery 100, so that stable region B becomes long as compared with that of each battery.

In addition, as illustrated in FIGS. 5A and 5B, first battery 100 mainly charges and discharges in region 331 of voltages Vh to Vm, and second battery 200 mainly charges and discharges in region 332 of voltages Vm to Vl. Note that, it is assumed that the boundary between regions 331 and 332 substantially matches with a state of charge of 50%.

For example, let us suppose that the user of an electric automobile used a fully-charged electric automobile in the morning. In this case, as illustrated in FIG. 5C, battery system 10 discharges, and the state of charge (remaining charge capacity) decreases to approximately 50%, for example. Up to this point, first battery 100 discharges, mainly.

Let us suppose that the user does not use the electric automobile and connects battery system 10 to an outside power supply during lunch break. In this case, as illustrated in FIG. 5D, battery system 10 is charged and its state of charge (remaining charge capacity) recovers up to approximately 100%, for example. Up to this point, second battery 200 has barely discharged, so that first battery 100 is mainly charged.

Let us suppose that the user uses the electric automobile that has been fully charged, again for a long time in the afternoon. In this case, as illustrated in FIG. 5E, battery system 10 discharges for a long time, and its state of charge (remaining charge capacity) decreases down to approximately 25%, for example. In this case, first battery 100 discharges during the initial phase of discharging, and after the state of charge decreases to 50%, second battery 200 starts discharging.

Let us suppose that the user does not use the electric automobile in the evening and connects battery system 10 to an external power supply. In this case, as illustrated in FIG. 5F, battery system 10 is charged, and its state of charge (remaining charge capacity) recovers up to approximately 100%, for example. In this charging, first and second batteries 100 and 200 are both charged.

As described above, in the actual charge and discharge pattern, first battery 100 is charged and discharged with high frequency. In other words, the frequency of charge and discharge of second battery 200 is low as compared with first battery 100. Stated differently, taking into account the actual use environment, first battery 100 is more often stored in a discharged state while second battery 200 is more often stored in a charged state.

Accordingly, adopting a battery having a better capacity recovery performance when stored in a discharged state than when stored in a charged state for first battery 100 can improve the performance of the entire battery. In addition, adopting a battery having a better capacity recovery performance when stored in a charged state than when stored in a discharged state for second battery 200 can improve the performance of the entire battery.

Stated differently, battery system 10 can effectively utilize the characteristics of the batteries when first and second batteries 100 and 200 having the above mentioned capacity recovery performances are used.

Moreover, in a case where second battery 200 having a characteristic that over-discharging accelerates deterioration, battery system 10 can prevent deterioration of second battery 200, which would otherwise occur due to the over-discharging.

In battery system 10 as described above, some conditions for combining first and second batteries 100 and 200 that make it possible to utilize the characteristics of the individual batteries while preventing degradation in performance of the entire battery are illustrated below.

FIG. 6 is a diagram illustrating exemplary conditions for combining first and second batteries 100 and 200.

As illustrated in FIG. 6, vertical range 351 of voltage unstable portion A for a voltage higher than voltage stable portion B is wider for second battery 200, while vertical range 353 of voltage unstable portion A' for a voltage lower than voltage stable portion B is wider for first battery 100. Meanwhile, voltage 352 of voltage stable portion B is higher for first battery 100, as described above. In the nominal voltage range, charged-state retention characteristic 354 is better for second battery 200 and discharged-state retention characteristic 355 is better for first battery 100.

Battery type 356, which realizes a combination of these items, includes a lithium-ion battery for first battery 100 and a lead-acid battery for second battery 200. Note that, a ternary-based, Ni-based, Fe-based, or Ti-based lithium-ion battery is favorably used as the aforementioned lithium-ion battery, while an open-type lead-acid battery is favorably used as the aforementioned lead-acid battery. The open-type lead-acid batteries are favorably used because they are chargeable with a higher charging voltage than that of closed-type lead-acid batteries and are relatively resistant to overcharging because water refilling is possible.

As described above, the battery system according to the present invention can optimize the use conditions of individual batteries.

Hereinafter, a description will be given of an embodiment of the present invention.

Figure 7:
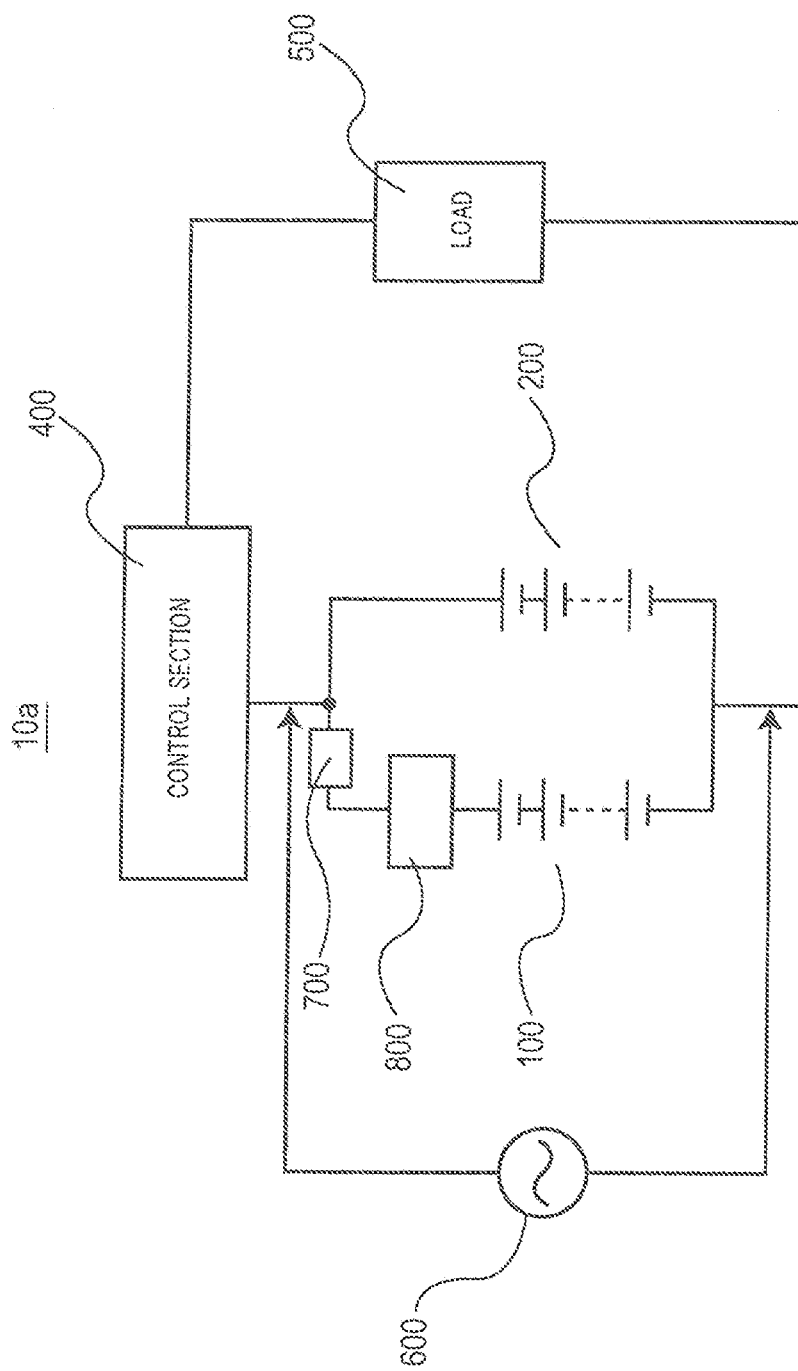
FIG. 7 is a block diagram illustrating a configuration of a battery system according to an embodiment of the present invention.

FIG. 7 is a block diagram illustrating a configuration of a battery system according to an embodiment of the present invention. FIGS. 8 to 10 are diagrams each illustrating a specific example of the first and second batteries.

As illustrated in FIG. 7, first and second batteries 100 and 200 are connected to each other in parallel in battery system 10*a*. Two ends of each of first and second batteries 100 and 200 are connected to load 500 via control circuit 400. Moreover, the two ends of each of first and second batteries 100 and 200 are configured to be connected to and thus charged by power supply 600 as appropriate. Meanwhile, switch 700 is disposed between first and second batteries 100 and 200.

First and second batteries 100 and 200 are batteries illustrated in FIG. 8, for example.

As illustrated in FIG. 8, first battery 100 is a LiFePO4 lithium-ion battery with a nominal voltage of 57.6V, for example, and includes series-connected 18 battery cells with a nominal voltage of 3.2V. In this case, first battery 100 is favorably equipped with protection circuit 800 (see FIG. 7), which monitors charging and discharging, for ensuring safety.

Meanwhile, second battery 200 is an open-type lead-acid battery with a nominal voltage of 48V and includes series-connected 24 battery cells with a nominal voltage of 2V.

Alternatively, first and second batteries 100 and 200 are batteries illustrated in FIG. 9, for example.

As illustrated in FIG. 9, first battery 100 is a lithium-ion battery of NCR18650A (LiNiO2) type with a nominal voltage of 57.6V and includes series-connected 16 battery cells with a nominal voltage of 3.6V. In this case as well, first battery 100 is preferably equipped with protection circuit 800 (see FIG. 7). Meanwhile, the battery identical to that in the example illustrated in FIG. 8 is used for second battery 200.

As illustrated in FIG. 10, first battery 100 is a lithium-ion titanate battery with a nominal voltage of 57.6V and includes series-connected 24 battery cells with a nominal voltage of 2.4V. In this case as well, first battery 100 is preferably equipped with protection circuit 800 (see FIG. 7). Meanwhile, the battery identical to that in the example illustrated in FIGS. 8 and 9 is used for second battery 200.

Control circuit 400 in FIG. 7 is provided for controlling the entire system and includes functions to control the states of charge and discharge, voltages, and currents or the like of first and second batteries 100 and 200. Load 500 is, for example, a motor of an electric automobile. Power supply 600 is, for example, a commercial power supply, and is connected to first and second batteries 100 and 200 via an outlet (not illustrated) or the like. Note that, power supply 600 may include a motor of an electric automobile, and in this case, first and second batteries 100 and 200 are supplied with regenerative energy.

Switch 700 has a function to block a current flowing from first battery 100 to second battery 200 in accordance with at least one of a current flow state such as a state where the current continuously flows from first battery 100 to second battery 200 for a predetermined period, and a voltage change state of second battery 200. More specifically, switch 700 blocks the current, for example, when a current having a value equal to or greater than a predetermined value flows continuously from first battery 100 to second battery 200 for a predetermined period or longer, or the current decreases to a predetermined value or lower, or the voltage of second battery 200 decreases to a predetermined value or lower, for example. The reasons for providing switch 700 will be given below.

For example, let us suppose that first and second batteries 100 and 200 are charged up to the same voltage and then charging is stopped, and first and second batteries 100 and 200 are left while being connected to each other. In this case, the current flows from first battery 100 to second battery 200.

First battery 100 has a better capacity recovery performance when stored in a discharged state than when stored in a charged state as described above. Accordingly, discharging from first battery 100 to second battery 200 after charging is favorable in order for first battery 100 to have a long lifetime. Meanwhile, second battery 200 has a better capacity recovery performance when stored in a charged state than when stored in a discharged state as described above. Accordingly, keeping the voltage of second battery 200 high even after charging is favorable in order for second battery 200 to have a long lifetime.

Accordingly, battery system 10*a* can keep the favorable characteristics for both first and second batteries 100 and 200.

Meanwhile, when discharging is performed immediately after charging, the voltage of first battery 100 drops because of discharging, for example. For this reason, the amount of current flowing from first battery 100 to second battery 200 is small.

Meanwhile, when the system is left after charging is done and stopped, the voltage of first battery 100 is kept high, and the voltage of second battery 200 is kept in the state of unstable region A2. For this reason, the current flow from first battery 100 to second battery 200 continues. Accordingly, even though charging is performed, the charged power ends up being consumed between first and second batteries 100 and 200.

Accordingly, a long untouched period after charging is expected to occur, it is favorable to block the current flowing from first battery 100 to second battery 200. Provision of switch 700 is for this reason. Note that, switch 700 may be provided closer to second battery 200 than to first battery 100.

In battery system 10*a*, the voltage of first battery 100 follows a moderate voltage change in stable region B2 of second battery 200 as described above, so that it does not drop drastically to lower limit voltage Vl in unstable region A1'. For this reason, control circuit 400 can accurately monitor the voltage of the entire battery and more surely suppress a risk of over-discharging of first battery 100.

As described above, battery system 10*a* according to the embodiment combines first battery 100 and second battery 200 and thus can increase the capacity inexpensively and increase the lifetime of the batteries while achieving optimization for use conditions. Stated differently, battery system 10*a* according to the embodiment has characteristics including: being capable of increasing the capacity of the system inexpensively; and a high charge receiving performance as well as being resistant to performance degradation. In addition, the present invention is applicable to various kinds of lithium-ion batteries having different cell voltages as described above.

When a lead-acid battery is adopted for second battery 200, second battery 200 has a characteristic that discharging down to a low state of charge (i.e., over-discharging) causes degradation to proceed, thereby reducing the cycle life.

In this respect, in battery system 10*a* according to the embodiment, first battery 100 may be configured to have higher output and higher capacity than second battery 200. This configuration allows second battery 200 to discharge after discharging of first battery 100, thereby allowing second battery 200 to be kept in a highly charged state as much as possible.

It is particularly desirable to employ a lithium-ion battery that can easily exhibit a difference in output and capacity from a lead-acid battery, but a nickel-hydrogen battery may be employed.

The term "high output" used herein means that the rating capacity rate when discharging is performed at 1 It is higher than a comparison target battery. The rating capacity rate of a lead-acid battery is approximately 50%. Meanwhile, the rating capacity rate of a lithium-ion battery or a nickel-hydrogen battery is approximately 90%. Accordingly, adopting a lithium-ion battery or a nickel-hydrogen battery for first battery 100 and a lead-acid battery for second battery 200 can configure first battery to have a higher output than second battery 200.

In addition, the term "high capacity" used herein means that the volume energy density or weight energy density is higher than a comparison target battery.

For example, there is an open-type lead-acid battery having a specification including a nominal voltage of 48V and a capacity of 725 Ah, i.e., there is an open-type lead-acid battery having a total weight of approximately 1175 kg and a volume of approximately 13.2 L with an energy of 34800 Wh. This open-type lead-acid battery has a weight energy density of approximately 30 Wh/kg (volume energy density of 109 Wh/L), which is considered to be an open-type lead-acid battery of largest-class capacity among lead-acid batteries. In other words, an assumption is made that the energy density of other lead-acid batteries does not exceed the capacity of the energy density of this open-type lead-acid battery.

Meanwhile, a lithium-ion battery has a specification including, for example, a nominal voltage of 3.6V and a capacity of 2 Ah, i.e., the lithium-ion battery has a total weight of approximately 0.045 kg and a volume of approximately 0.0165 L at an energy of 7.2 Wh. This lithium-ion battery has a weight energy density of approximately 160 Wh/kg (volume energy density of 435 Wh/L).

Meanwhile, a nickel-hydrogen battery has a specification including, for example, a nominal voltage of 1.2 V and a capacity of 5 Ah, i.e., the nickel-hydrogen battery has a total weight of approximately 0.15 kg and a volume of approximately 0.0424 L. This nickel-hydrogen battery has a weight energy density of approximately 40 Wh/kg (volume energy density of 141 Wh/L).

More specifically, setting a high capacity threshold to a weight energy density of 35 Wh/kg (volume energy density of 120 Wh/L) approximately makes a lithium-ion battery or nickel-hydrogen battery have a higher capacity than a lead-acid battery. Accordingly, adopting a lithium-ion battery or a nickel-hydrogen battery having a weight energy density of 35 Wh/kg or greater for first battery 100, and adopting a lead-acid battery for second battery 200 makes first battery 100 have a higher capacity than second battery 200.

Furthermore, a description has been given of an example of blocking between first and second batteries 100 and 200 using switch 700 in the description of the battery system in FIG. 7, but conditions for blocking are not limited to this example.

In general, the cycle life characteristics of lithium-ion batteries degrade as the stop time (stored time) between charging and discharging becomes long. This is because leaving a battery in a charged state keeps a high voltage state, so that the electrolyte within battery cells is affected by a high voltage of the battery itself and degrades, thus causing a negative influence on the characteristics of the battery cells.

For this reason, as in the case of small battery packs, possible measures are to provide a resistor in a battery and cause discharging to this resistor to drop the voltage in order to avoid degradation when stored in a charged state for a long time. However, in large capacity batteries such as ones applied to electric vehicles (EVs), the required resistance becomes large and provision of such resistor becomes difficult, while energy loss becomes large.

In this respect, when a lithium-ion battery is used as first battery 100, it is favorable that control circuit 400 (see FIG. 7) controls the operation of switch 700 so that the stop time mentioned above becomes as short as possible.

Figure 11:
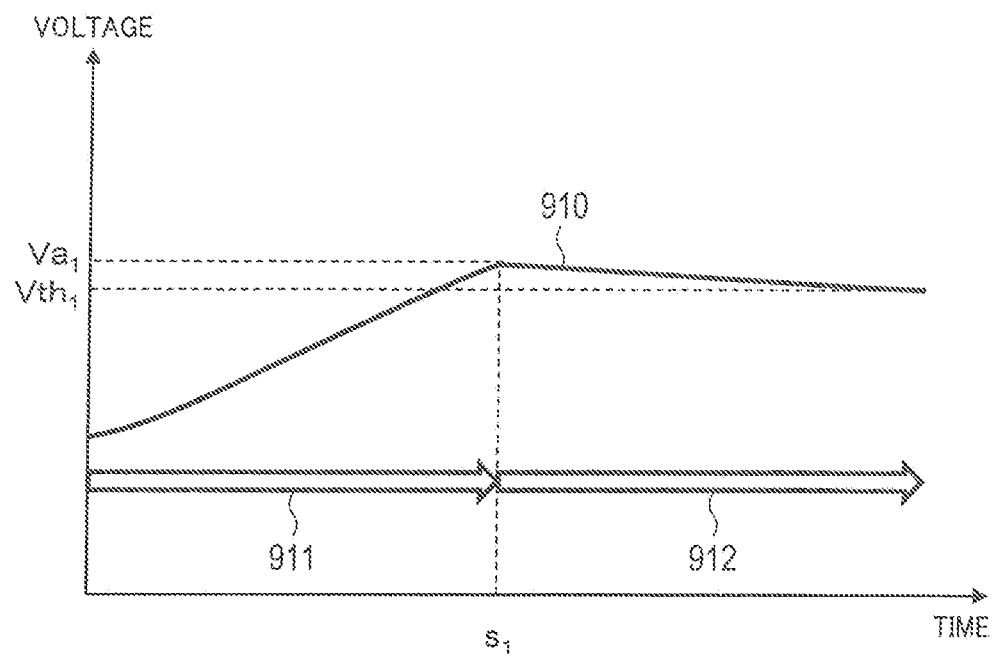
FIG. 11 is a diagram illustrating an example of how a switch is controlled in the embodiment.

FIG. 11 is a diagram provided for describing an example of how switch 700 is controlled. In FIG. 11, the vertical axis represents the battery voltage and the horizontal axis represents the time.

This example assumes a situation where charging is performed continuously for a relatively short time, e.g., one hour as in the case of lunch break described in FIG. 5D, that is, charging ends in the middle of charge and before completion of full-charge.

During charging, control circuit 400 turns on (connect) switch 700 to allow conduction between first and second batteries 100 and 200. In this case, as indicated with line 910 of FIG. 11, both first and second batteries 100 (lithium-ion battery) and 200 (lead-acid battery) are charged, first (section 911). Charging continues, but the charger stops or the user stops charging when first and second batteries 100 and 200 are charged up to predetermined voltage $Va_1$ at time $s_1$.

Control circuit 400 keeps switch 700 turned on (connected) even after time $s_1$ to allow the current to flow from first battery 100 to second battery 200 (section 912). Control circuit 400 turns off (blocks) switch 700 when the voltages of first and second batteries 100 and 200 drop to predetermined threshold $Vth_1$ at which the amount of influence on the cycle life characteristic is sufficiently small even when the battery is stored for a long time. More specifically, control circuit 400 prevents the current from flowing from first battery 100 to second battery 200.

Note that, when the voltages of first and second batteries 100 and 200 drop, after charging, at once to predetermined threshold $Vth_1$ at which the amount of influence on the cycle life characteristic is sufficiently small even when the battery is stored for a long time, the overall capacity of the batteries may decrease too much when the batteries are used next time. For this reason, control circuit 400 may intermittently repeat turning off (blocking) and reconnection (turning on) of switch 700 until the voltages decrease to threshold $Vth_1$.

As described above, setting a short stop time for first battery 100 makes it possible to stably use first battery 100 as a lithium-ion battery for a longer time.

Alternatively, control circuit 400 may control the operation of switch 700 so as to make the voltage low when charging of first battery 100 ends.

Figure 12:
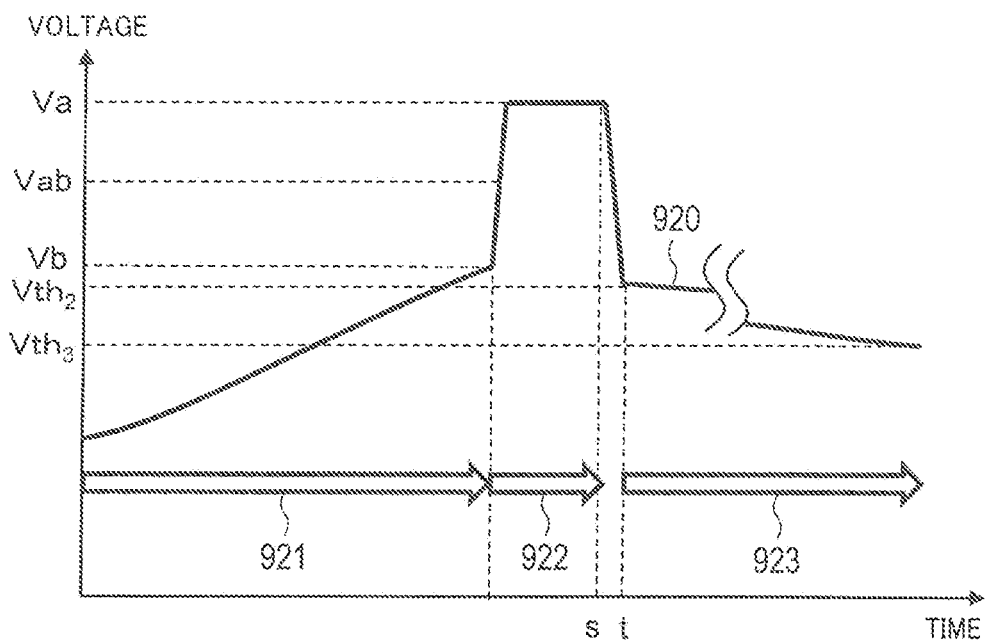
FIG. 12 is a diagram illustrating another example of how the switch is controlled in the embodiment.

FIG. 12 is a diagram illustrating another example of how switch 700 is controlled, and corresponding to FIG. 1.

This example assumes a situation where charging is performed continuously for a relatively long time as in the evening described in FIG. 5F, i.e., a situation where charging ends upon completion of full-charge.

During charging, control circuit 400 turns on switch 700 to allow conduction between first and second batteries 100 and 200. In this case, as indicated with line 920 of FIG. 12, both first and second batteries 100 (lithium-ion battery) and 200 (lead-acid battery) are charged, first (section 921).

When charging continues and first and second batteries 100 and 200 are charged to predetermined voltage Vb, control circuit 400 turns off (blocks) switch 700 and stops charging of first battery 100. Voltage Vb is a predetermined full-charge voltage of first battery 100.

When charging continues and second battery 200 is charged to predetermined voltage Vab (Vb<Vab<Va), control section 400 switches control to charge control with a constant current, and charges only second battery 200 up to predetermined voltage Va (section 922). Voltage Va is a predetermined full-charge voltage of second battery 200.

Note that, first battery 100 is kept at full-charge voltage Vb and continuously kept at a relatively high voltage as compared with the case illustrated in FIG. 11, during this period.

For this reason, the degree of deterioration may become relatively high as compared with the case illustrated in FIG. 11.

When charging is stopped at time s after elapse of a certain time, the voltage of the second battery in the unstable region drops quickly. An assumption is made that the voltage of second battery 200 further drops below voltage Vb of first battery 100 and drops to threshold $Vth_2$ at time t as illustrated in FIG. 12. At this time, control circuit 400 turns on (reconnects) switch 700 to allow the current to flow from first battery 100 to second battery 200 (section 923).

As described above, appropriately controlling switch 700 makes it possible to utilize second battery 200 as a resistor for discharging first battery 100. More specifically, the voltage during the stop time of first battery 100 can be suppressed to a low capacity without newly providing a resistor for discharging first battery 100. Furthermore, compensating for self-discharge of second battery 200 can make second battery 200 absorb the energy discharged from first battery 100, thereby enabling suppression of energy loss as a whole.

Control circuit 400 turns off (blocks) switch 700 again when the voltage of first battery 100 drops to predetermined threshold $Vth_3$ at which the amount of influence on the cycle life characteristic is sufficiently small even when the battery is stored for a long time. More specifically, control circuit 400 prevents the current from flowing from first battery 100 to second battery 200. Thus, the current flows from first battery 100 to second battery 200 for a long time, and first battery 100 can be prevented from decreasing in capacity.

Note that, the present invention can be modified in various ways within the scope not departing from the gist of the invention. The embodiment described above is provided as an illustrative example, and not intended to limit the scope of the present invention.

For example, the battery system according to the present invention can be applied to not only electric automobiles but also electric vehicles such as an electric scooter and a forklift. In addition, the present invention can be applied to not only electric vehicles but also to various types of other systems as well as various types of other devices.

A battery system according to this disclosure is a battery system including a combination of first and second batteries, in which the first battery has a discharge characteristic that includes a stable region where a voltage change rate with respect to a discharged capacity is small, the second battery has a discharge characteristic that includes: a stable region where a voltage change rate with respect to a discharged capacity is small in a voltage range lower than a voltage of the stable region of the first battery; and an unstable region where a voltage change rate with respect to a discharged capacity is large in a voltage range that overlaps a voltage in the stable region of the first battery, and the first battery and the second battery are connected to each other in parallel so that a state of discharge of an entire battery including the first battery and the second battery transitions from the stable region of the first battery to the stable region of the second battery in a discharge process of the entire battery.

In the battery system, the discharge characteristic of the first battery may include an unstable region where the voltage change rate with respect to a discharged capacity is large in a voltage range that overlaps a voltage in the stable region of the second battery.

In the battery system, a minimum value of the voltage in the stable region of the first battery may substantially match with a maximum value of the voltage in the stable region of the second battery.

In the battery system, at least one of the first battery and the second battery may be formed of a plurality of battery cells connected in series.

In the battery system, the first battery may be a battery having a better capacity recovery performance when stored in a discharged state than when stored in a charged state, and the second battery may be a battery having a better capacity recovery performance when stored in a charged state than when stored in a discharged state.

In the battery system, the first battery may be a lithium-ion battery, and the second battery may be a lead-acid battery.

In the battery system, the second battery may be an open-type lead-acid battery.

In the battery system, the second battery may be a lead-acid battery, and the first battery may have a higher output and a higher capacity than the second battery.

In the battery system, the first battery may be a lithium-ion battery.

The battery system may further include a switch that is disposed between the first battery and the second battery and that blocks a current in accordance with at least one of a flow state of the current from the first battery to the second battery and a voltage change state.

In the battery system, the switch may make reconnection when a voltage of the second battery becomes lower than a voltage of the first battery.

In the battery system, the switch may block the current from the first battery to the second battery when the voltage of the first battery becomes lower than a predetermined threshold.

The disclosure of Japanese Patent Application No. 2013-077888, filed on Apr. 3, 2013, including the specification, drawings and abstract, is incorporated herein by reference in its entirety.

INDUSTRIAL APPLICABILITY

The present invention is useful as a battery system which is capable of being increased in capacity inexpensively and which has a high charge receiving performance, while being hard to degrade in performance.

REFERENCE SIGNS LIST

10, 10a Battery system
100 First battery (lithium-ion battery)
200 Second battery (lead-acid battery)
400 Control circuit
500 Load
600 Power supply
700 Switch
800 Protection circuit

The invention claimed is:

1. A battery apparatus including a combination of first and second batteries, wherein
the first battery has a first discharge characteristic that includes a first stable region and a first unstable region defined by a voltage change rate with respect to a state of charge (SOC),
the second battery has a second discharge characteristic that includes a second stable region and a second unstable region defined by a voltage change rate with respect to the state of charge (SOC),
the first stable region has a small voltage change rate with respect to the state of charge (SOC) compared with the first unstable region,
the second stable region has a small voltage change rate with respect to the state of charge (SOC) compared with the second unstable region,
the first discharge characteristic includes the first unstable region in a last phase side of discharge in a voltage range that overlaps a voltage in the second stable region of the second battery,
the second discharge characteristic includes: the second stable region in a voltage range lower than a voltage of the first stable region of the first battery; and the second unstable region in an initial phase side of discharge in a voltage range that overlaps a voltage in the first stable region of the first battery,
the first battery and the second battery are connected to each other in parallel so that a state of discharge of an entire battery including the first battery and the second battery transitions from the first stable region of the first battery to the second stable region of the second battery in a discharge process of the entire battery, and
a minimum value of the voltage in the first stable region of the first battery substantially matches with a maximum value of the voltage in the second stable region of the second battery.

2. A battery apparatus including a combination of first and second batteries, wherein
the first battery has a first discharge characteristic that includes a first stable region where a voltage change rate with respect to a state of charge (SOC) is small,
the second battery has a second discharge characteristic that includes: a second stable region where a voltage change rate with respect to the state of charge (SOC) is small in a voltage range lower than a voltage of the first stable region of the first battery; and a second unstable region where a voltage change rate with respect to the state of charge (SOC) is large in a voltage range that overlaps a voltage in the first stable region of the first battery, and
the first battery and the second battery are connected to each other in parallel so that a state of discharge of an entire battery including the first battery and the second battery transitions from the first stable region of the first battery to the second stable region of the second battery in a discharge process of the entire battery.

3. The battery apparatus according to claim 2, wherein the first discharge characteristic of the first battery includes a first unstable region where the voltage change rate with respect to the state of charge (SOC) is large in a voltage range that overlaps a voltage in the second stable region of the second battery.

4. The battery apparatus according to claim 2, wherein a minimum value of the voltage in the first stable region of the first battery substantially matches with a maximum value of the voltage in the second stable region of the second battery.

5. The battery apparatus according to claim 3, wherein at least one of the first battery and the second battery is formed of a plurality of battery cells connected in series.

6. The battery apparatus according to claim 2, wherein
the first battery is a battery having a better capacity recovery performance when stored in a discharged state than when stored in a charged state, and
the second battery is a battery having a better capacity recovery performance when stored in a charged state than when stored in a discharged state.

7. The battery apparatus according to claim 5, wherein
the first battery is a lithium-ion battery, and
the second battery is a lead-acid battery.

8. The battery apparatus according to claim 6, wherein the second battery is an open-type lead-acid battery.

9. The battery apparatus according to claim 2, wherein
the second battery is a lead-acid battery, and
the first battery has a higher output and a higher capacity than the second battery.

10. The battery apparatus according to claim 8, wherein the first battery is a lithium-ion battery.

11. The battery apparatus according to claim 2, further comprising a switch that is disposed between the first battery and the second battery and that blocks a current in accordance with at least one of a flow state of the current from the first battery to the second battery and a voltage change state.

12. The battery apparatus according to claim 11, wherein the switch makes reconnection when a voltage of the second battery becomes lower than a voltage of the first battery.

13. The battery apparatus according to claim 11, wherein the switch blocks the current from the first battery to the second battery when the voltage of the first battery becomes lower than a predetermined threshold.

* * * * *